(12) United States Patent
Breier et al.

(10) Patent No.: US 6,324,056 B1
(45) Date of Patent: Nov. 27, 2001

(54) DEVICE FOR COOLING A PERSONAL COMPUTER HOUSED IN A CASING

(75) Inventors: Anton Breier, Friedberg; Werner Luplow; Michael Riebel, both of Kissing; Stefan Schröder, Augsburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/445,497

(22) PCT Filed: Apr. 7, 1999

(86) PCT No.: PCT/DE99/01038

§ 371 Date: Dec. 8, 1999

§ 102(e) Date: Dec. 8, 1999

(87) PCT Pub. No.: WO99/53392

PCT Pub. Date: Oct. 21, 1999

(30) Foreign Application Priority Data

Apr. 8, 1998 (DE) .............................. 198 15 871

(51) Int. Cl.⁷ .................................................. H05K 7/20
(52) U.S. Cl. .................. 361/687; 361/685; 361/690; 361/695; 361/752; 165/80.3; 174/16.3
(58) Field of Search ..................................... 361/683–687, 361/690–692, 697–699, 704–710, 802, 806, 752, 808, 814–818; 174/50.1, 50.2, 16.3; 181/151, 260, 202, 200, 283; 364/208, 708.1, 708.2; 165/80.3, 80.4, 185

(56) References Cited

U.S. PATENT DOCUMENTS

| 4,505,394 | 3/1985 | Reimer . |
| 5,036,481 | 7/1991 | Lunsford et al. . |
| 5,236,259 | * 8/1993 | Ryan et al. ........................ 312/244 |
| 5,243,493 | * 9/1993 | Jeng et al. ........................ 361/690 |
| 5,383,340 | 1/1995 | Larson et al. . |
| 5,414,591 | 5/1995 | Kimura et al. . |
| 5,424,913 | 6/1995 | Swindler . |
| 5,457,602 | 10/1995 | Kimura et al. . |
| 5,596,483 | * 1/1997 | Wyler .............................. 361/683 |
| 5,673,029 | * 9/1997 | Behl et al. ........................ 340/635 |
| 5,712,762 | 1/1998 | Webb . |
| 5,813,243 | * 9/1998 | Johnson et al. ................... 62/259.2 |

FOREIGN PATENT DOCUMENTS

| 1 103 433 | 3/1961 | (DE) . |
| 31 21 906 | 4/1982 | (DE) . |
| G 90 05 147.5 | 8/1990 | (DE) . |
| G 94 03 364.1 | 6/1994 | (DE) . |
| 42 17 431 | 8/1994 | (DE) . |
| 298 23 495 | 9/1999 | (DE) . |
| 404335597A | * 11/1992 | (JP) ............................... H05K/7/20 |
| WO 95/32457 | 11/1995 | (WO) . |
| WO 96/17506 | 6/1996 | (WO) . |
| WO 97/29623 | 8/1997 | (WO) . |

OTHER PUBLICATIONS

Abstract of Japanese 04–335597, *Patent Abstracts of Japan*, vol. 017, No. 188 (E–1349), Apr. 13, 1993.

Abstract of Japanese 05–073175, *Patent Abstracts of Japan*, vol. 17, No. 405, P–1581, Jul. 28, 1993.

* cited by examiner

*Primary Examiner*—Leo P. Picard
*Assistant Examiner*—Michael Datskovsky
(74) *Attorney, Agent, or Firm*—Schiff Hardin & Waite

(57) ABSTRACT

The heat-critical elements of the personal computer (PC) are arranged such with reference to air intake and air exit openings in the housing as well as with reference to cooling members attached laterally or, respectively, to the outside walls of the housing that an adequate and exclusively passive cooling is achieved by thermal conduction, convection and chimney effects. The device of the invention can be employed for cooling PCs, particularly in flat desktop structure.

10 Claims, 2 Drawing Sheets

DEVICE FOR COOLING A PERSONAL COMPUTER HOUSED IN A CASING

BACKGROUND OF THE INVENTION

The invention is directed to a device for cooling a personal computer accommodated in a housing.

Due to the development of heat of their components, personal computers are equipped with cooling measures. Modules that are especially heat-critical are the microprocessor module, the drives, the power supply assembly and expansion assemblies, which are usually fashioned in the form of plugin cards. In a way that is currently standard, the inside of the housing of the personal computer and, in particular, the critical PC components are respectively actively force-aerated by one or more aerators or fans respectively driven by an electric motor and are thus adequately cooled for operation of the computer.

The aerators that are utilized, however, are accompanied by certain disadvantages. Due to mechanical wear and the blocking possibility of the rotating 15 parts, there is always a considerable outage risk that is sometimes countered by additionally provided alarm devices.

Given outage of an aerator, this must either be repaired or replaced, which requires service outlay, entirely apart from the fact that the installation of one or more aerators already involves a considerable cost outlay. Further, the aerators provided in the computer require additional space, as a result whereof a space requirement of the personal computer that is larger overall is incurred.

Finally, one disadvantage in the employment of motor-driven aerators for cooling in the computer is that a considerable noise level is produced that negatively influences direct work at the computer and, over and above this, also complicates and disturbs activities in rooms in which one or more PCs are located.

SUMMARY OF THE INVENTION

The invention is therefore based on the object of specifying measures for cooling a personal computer and, in particular, the heat-critical components thereof such as the microprocessor module, the drives, the power supply and expansion assemblies, so that specific boundary conditions are adhered to, namely the realizability of the cooling measures in arbitrary PC housings, particularly in flat desktops, a minimization of the noise level, a maximization of the outage dependability and an adequate cooling capacity for high-performance microprocessors up to approximately 50 Watts.

To accomplish these objects, the device of the present invention has one or more of the following features:

a) a location for the microprocessor module on the system assembly is arranged so that a thermally conductive connection is produced from the microprocessor module to a cooling member;

b) the housing floor has perforations and the housing cover is arranged in the form of a slanting plane placed obliquely, so that an air stream is generated that emerges from the housing through device openings placed at suitable locations in the housing;

c) the plugin locations for the acceptance of the expansion assemblies are arranged obliquely, so that an air stream is generated along the expansion assemblies proceeding in the form of slanting planes, and the air stream emerges from the housing through device openings placed at suitable locations in the housing;

d) the drives are arranged in the full air stream so that each and every one of these drives receives adequate air with the assistance of channels;

e) the power components of the power supply assembly are arranged on a cooling member; and f) the power supply assembly is arranged in the air stream created by the perforations in the housing floor, the oblique cover and device openings.

A device comprising combination features of the invention effects a passive cooling by thermal conduction, convection and chimney effects. The invention is formed of a feature combination that defines various points of the system design.

The placement of the microprocessor module at a defined location on the system assembly recited in combination feature a), preferably at the edge of this assembly, is not trivial and is not comparable to solutions known from amplifier or power supply technology since the processor is connected and operated via several hundred high-frequency signals.

Compared to cooling devices currently realized in PCs with one or more aerators, or fans the measures according to the invention yield critical advantages. The outage dependability is considerably enhanced since a mechanical wear and a blocking of rotating parts are eliminated. The technical and cost-oriented outlay for a personal computer is reduced since an equipping with aerators or fans is eliminated.

The service outlay during the useful life of a computer is also greatly reduced since no aerator failures with their serious consequences can occur. With respect to the noise generated by the personal computer, the application of the measures indicated by the invention yields a noticeable reduction of the noise level, since motors and aerators producing air movement and noises are no longer required.

Given the device of the invention, thus, cooling possibilities that were hitherto unknown in PC technology are utilized. The cooling effect is optimized under the boundary conditions or a possible, low desktop set, of a minimal sound creation as well as a maximum service life and outage dependability of the personal computer.

The microprocessor is arranged at the edge of the system so that a direct connection, such as by a heat or transmission element to the cooling member, which is part of an outside wall of the housing, can be obtained.

Other features and advantages of the invention will be apparent from the claims, description of the preferred embodiment and drawings.

DESCRIPTION OF THE PREFERRED EMBODIMENT

Figure 1:
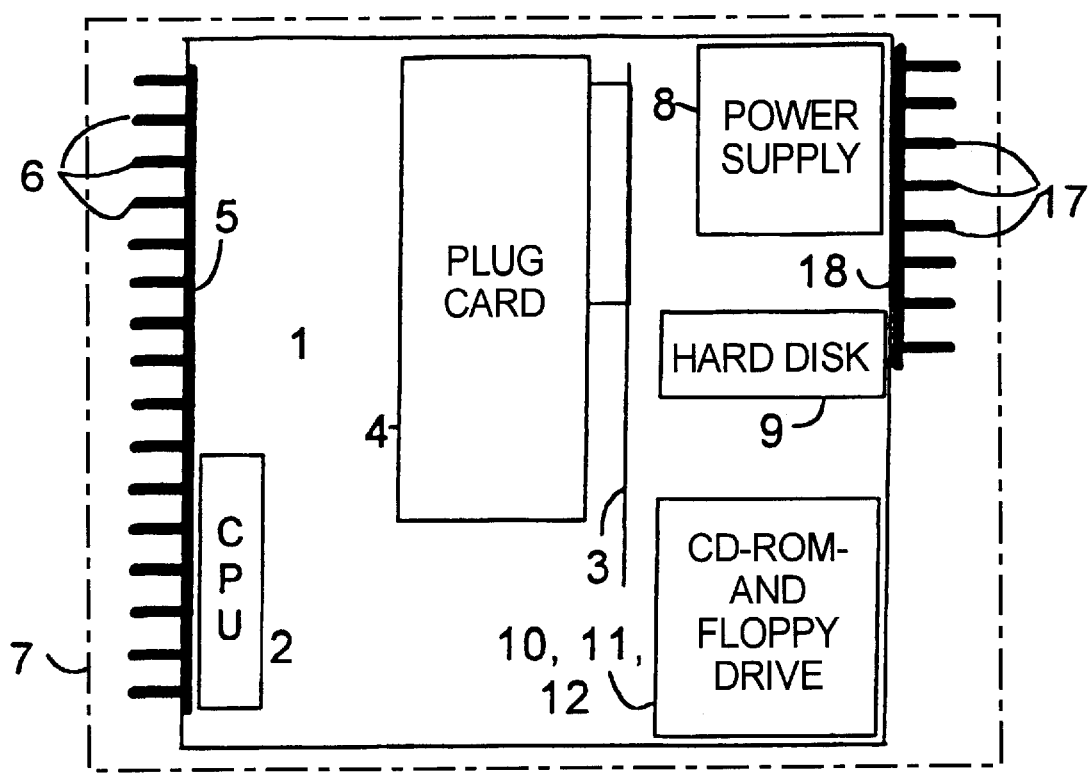
FIG. 1 is a schematic plan view onto the inside of a personal computer cooled according to invention.

On a system assembly or motherboard 1, which is arranged over a housing floor 13 (visible in FIGS. 2 and 3), the personal computer shown in FIG. 1 comprises a microprocessor module 2 and a plug card receptacle board (platter) 3 into which expansion assemblies 4 fashioned as plugin cards are plugged, for example a graphics adapted and a sound card.

The microprocessor module 2 connected to the system assembly 1 via several hundred signals is attached to a defined location of this system assembly 1, namely at the edge, in order to produce a direct, thermally conductive connection from the microprocessor module 2 to a cooling member 5. To this end, the cooling member 5 is provided with a plurality of outwardly projecting cooling ribs 6 or corresponding surfaces optimized for outputting heat.

The cooling member 5 can form an outside wall of the housing or lie under a cover hood 7 covering the computer. A power supply assembly 8, a hard disk drive 9 and a floppy drive 10 as well as CD-ROM drives 11 and 12 are also arranged in the housing of the computer.

Figure 2:
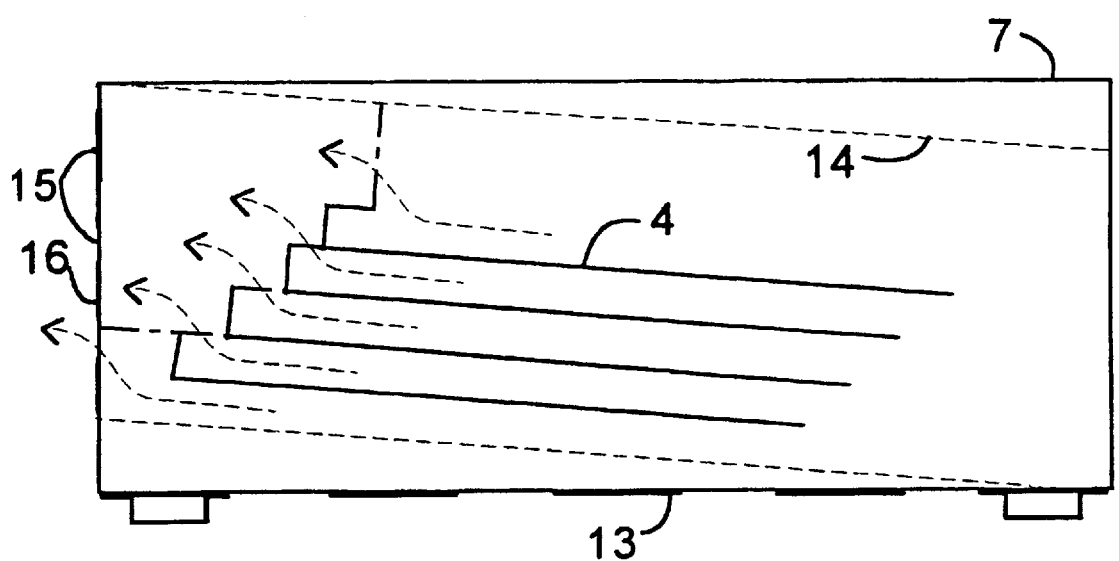
FIG. 2 is a schematic side view—not to scale—of that part of the inside of the computer shown in FIG. 1 that is responsible for the cooling of the expansion assemblies.
Figure 3:
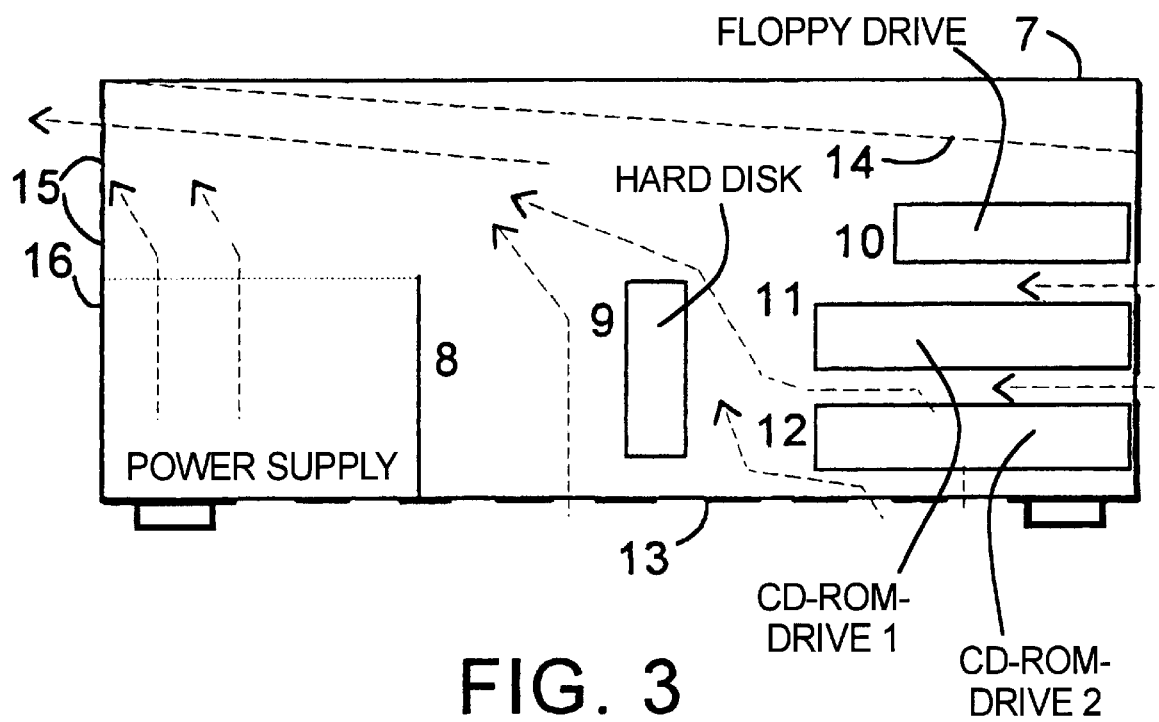
FIG. 3 is a corresponding side view of that part of the inside of this computer that is responsible for the cooling of the drives and of the power supply assembly.

As can be seen in FIG. 2 and/or in FIG. 3 in conjunction with FIG. 1, the housing floor 13 comprises perforations. A housing cover 14 in the form of a slanting plane is arranged obliquely by about 10° relative to the horizontal. An air stream to be seen in FIG. 3 thereby arises, this, ascending from the housing floor 13, leaving the apparatus through openings 15 in a housing wall 16 or in the cover hood 7. The air stream is indicated by arrows.

The plugin locations of the expansion assemblies 4 in the plug card receptacle board 3 are arranged obliquely, so that the expansion assemblies 4 implemented as plug cards proceed in slanting planes. Due to the oblique positioning of the expansion assemblies 4, an air stream—indicated by arrows in FIG. 2 in terms of its course—is generated that proceeds from the perforated housing floor 13, ascends between the expansion assemblies 4 as well as over the system assembly 1 and leaves the apparatus at the suitably applied openings 15 of the housing wall 16 or, respectively, of the cover hood 7.

The slanting planes in which the expansion assemblies 4 lie proceed parallel to one another or at least approximately parallel to the housing cover 14, so that the air stream is conducted largely turbulence-free to the device openings 15 between these elements.

As FIG. 3, shows, the hard disk drive 9 and the CD-ROM drive 12 are arranged in the full air stream, and the CD-ROM drive 11 as well as the floppy drive 10 are arranged partially in the full air stream and also in a respective intake air channel coming in laterally, so that each and every one of the drives 9 through 12 receives adequate air with the assistance of the main air stream and partially with the assistance of intake air channels. For optimum cooling, the hard disk drive 9 is preferably placed vertically and can be encapsulated in order to achieve a better sound damping.

The cooling of the power supply assembly 8 ensues on the basis of a arrangement of the power components on a cooling member 18 provided with laterally outwardly salient cooling ribs 17 as well as due to the air stream that is generated by the perforation of the housing floor 13 and the oblique placement of the housing cover 14, and which air stream leaves the device at the suitably applied openings 15. The cooling member 18, just like the cooling member 5, either forms a lateral outside wall of the housing or lies under the cover hood 7, whereby they are respectively aerated via channels and exit openings.

What is claimed is:

1. A device for cooling a personal computer accommodated in a housing having a housing floor, said personal computer containing a system assembly, a microprocessor module attached on the system assembly and connected thereto, drives, a power supply assembly and a plugin location for acceptance of expansion assemblies in the form of plug cards, the improvement comprising the housing floor being provided with perforations and the housing having a housing cover arranged in a slanting plane so that an air stream is generated that emerges from the housing through device openings placed at suitable locations in the housing.

2. A device according to claim 1, wherein the device openings for the exit of air streams are arranged on at least one of the outside walls of the housing and a cover hood.

3. A device according to claim 1, wherein the hard disk drive is arranged in a vertically erect attitude in an air stream.

4. A device according to claim 1, wherein the plugin location has a plug card receptacle board arranged vertically erect within the housing.

5. A device according to claim 1, wherein each of the slanting planes of the housing cover and any expansion module fashioned by the plug cards proceed substantially parallel to one another.

6. A device according to claim 1, wherein the plugin location for the acceptance of expansion modules are arranged to extend obliquely so that an air stream is generated along the expansion assemblies proceeding in the form of slanting planes and said air stream emerges from the housing through said device openings.

7. A device according to claim 1, wherein the drives are arranged in the full air stream so that each and every one of the drives receives adequate air with the assistance of channels and the power supply assembly is arranged in an air stream defined by the housing floor and the openings in the housing.

8. A device for cooling a personal computer accommodated in a housing having a housing floor, said personal computer containing a system assembly, a microprocessor module attached on the system assembly and connected thereto, drives, a power supply assembly and a plugin location for acceptance of expansion assemblies in the form of plug cards, the improvement comprising the plugin location for the acceptance of expansion modules being arranged to extend obliquely so that an air stream is generated along the expansion assemblies proceeding in the form of slanting planes and said air stream emerges from the housing through device openings placed at suitable locations in the housing.

9. A device according to claim 8, wherein the drives are arranged in the full air stream so that each and every one of the drives receives adequate air with the assistance of channels; and the power supply assembly is arranged in an air stream defined by the housing floor and the openings in the housing.

10. A device for cooling a personal computer accommodated in a housing having a housing floor, said personal computer containing a system assembly, a microprocessor module attached on the system assembly and connected thereto, drives, a power supply assembly and a plugin location for acceptance of expansion assemblies in the form of plug cards, the improvements comprising the drives being arranged in the full air stream so that each and every one of the drives receives adequate air with the assistance of channels and the power supply assembly being arranged in an air stream defined by the housing floor and openings in the housing.

* * * * *